United States Patent [19]

Nishimura et al.

[11] Patent Number: 4,562,905
[45] Date of Patent: Jan. 7, 1986

[54] CLUTCH OPERATION CONTROL SYSTEM FOR FLUID TORQUE CONVERTERS

[75] Inventors: Sadanori Nishimura; Masakazu Maezono; Keiichi Ishikawa, all of Saitama, Japan

[73] Assignee: Honda Giken Kogyo Kabushiki Kaisha, Tokyo, Japan

[21] Appl. No.: 602,376

[22] Filed: Apr. 20, 1984

[30] Foreign Application Priority Data

Apr. 22, 1983 [JP] Japan .................. 58-70055

[51] Int. Cl.[4] ............................................. F16D 47/06
[52] U.S. Cl. ........................ 192/0.032; 192/0.052; 192/0.076; 192/3.3; 192/3.31
[58] Field of Search .............. 192/0.032, 0.033, 0.052, 192/0.076, 0.092, 0.096, 3.28, 3.29, 3.3, 3.31, 3.57, 103 F

[56] References Cited

U.S. PATENT DOCUMENTS

| 3,252,352 | 5/1966 | General et al. | 192/3.22 X |
| 3,730,315 | 5/1973 | Annis et al. | 192/3.3 |
| 3,977,502 | 8/1976 | Chana | 192/3.3 |
| 3,985,046 | 10/1976 | Morris et al. | 192/3.31 X |
| 4,199,048 | 4/1980 | Ishikawa | 192/0.052 |

*Primary Examiner*—Rodney H. Bonck
*Assistant Examiner*—Richard M. Lorence
*Attorney, Agent, or Firm*—Lyon & Lyon

[57] ABSTRACT

An operation control system for a hydraulically operated clutch of a fluid torque converter wherein the clutch mechanically couples the input and output of the torque converter under certain conditions. Pressure chambers on either side of the clutch plate are pressurized to operate the clutch. An orifice through the clutch plate allows flow from one chamber to the other. A regulator valve is connected to both pressure chambers and is responsive thereto. The regulator valve is also responsive to external signals such as vehicle speed and throttle opening to regulate the pressure difference in the two chambers for operation of the clutch.

7 Claims, 4 Drawing Figures

CLUTCH OPERATION CONTROL SYSTEM FOR FLUID TORQUE CONVERTERS

The present invention relates to a clutch operation control system for a fluid torque converter which is used mainly in a vehicular transmission.

Devices of this general type for controlling the operation of the clutch of the torque converter to mechanically directly couple the input and output sides under certain predetermined conditions are well known, such as by U.S. Pat. Nos. 3,252,352 and 3,730,315, but such devices have various disadvantages. Assignee of the subject patent application has already proposed several improvements and differences for such clutch control devices through prior pending U.S. patent applications Ser. Nos. 495,267, filed May 17, 1983, Ser. No. 505,753, filed June 20, 1983 and Ser. No. 526,118, filed Aug. 24, 1983 but certain problems are not completely or efficiently solved by any one of those devices.

The aforementioned application Ser. No. 495,267 discloses a clutch operational control system for use in a torque converter of the type, in which there is provided a clutch for mechanically coupling the input and output sides of the torque converter and in which said clutch is a hydraulically actuated type adapted to be actuated by an application force according to the difference between the internal pressures of first and second oil chambers disposed at one and the other sides of a clutch plate thereof, said clutch operation control system being characterized in that said pressure difference is increased or decreased in response to an external signal such as a vehicular speed or a throttle opening of an engine so that said pressure difference is decreased to weaken the application force of said clutch in a region of high torque fluctuations such as at a low vehicular speed or with a small throttle opening thereby to allow the slippage of said clutch by which the torque fluctuations are absorbed. According to that proposal, while the clutch is being applied, said first oil chamber is connected to an air vent port to have its internal pressure held at an atmospheric level, and there is disposed an oil line leading to said second oil chamber a regulator valve which is made responsive to the external signal so that the aforementioned pressure difference may be generally increased or decreased by the hydraulic control of said second oil chamber by said regulator valve. In the event the oil temperature varies significantly, according to that proposal, the oil line resistance between said second oil chamber and said regulator valve is varied by the variation in the viscosity of the oil so that the internal pressure of said second oil chamber takes a level different from the set value by said regulator valve. This causes a disadvantage that the application force of the clutch cannot be accurately controlled in response to the external signal.

In order to eliminate that disadvantage, therefore, an object of the present invention is to provide a clutch operation control system which is enabled to accurately control the pressure difference of the two oil chambers irrespective of the change in the oil temperature. According to a feature of the present invention, in a fluid torque converter of the type in which there is provided a clutch for mechanically coupling the input and output sides of said torque converter, in which said clutch is constructed into such a hydraulically actuated type as is adapted to be actuated by an application force according to the difference between the internal pressures of first and second oil chambers disposed at one and the other sides of a clutch plate thereof, and in which said pressure difference is increased or decreased in response to an external signal, there is provided a clutch operation control system characterized in that communication is provided between said two oil chambers by way of an orifice; and in that there is disposed in a drain oil line leading from said first oil chamber a regulator valve which is made responsive to said external signal and which is exposed in opposite directions to the internal pressures of said two oil chambers so that said pressure difference may be controlled to a predetermined level according to said external signal.

The present invention will be described in the following in connection with the embodiment thereof with reference to the accompanying drawings.

Figure 1:
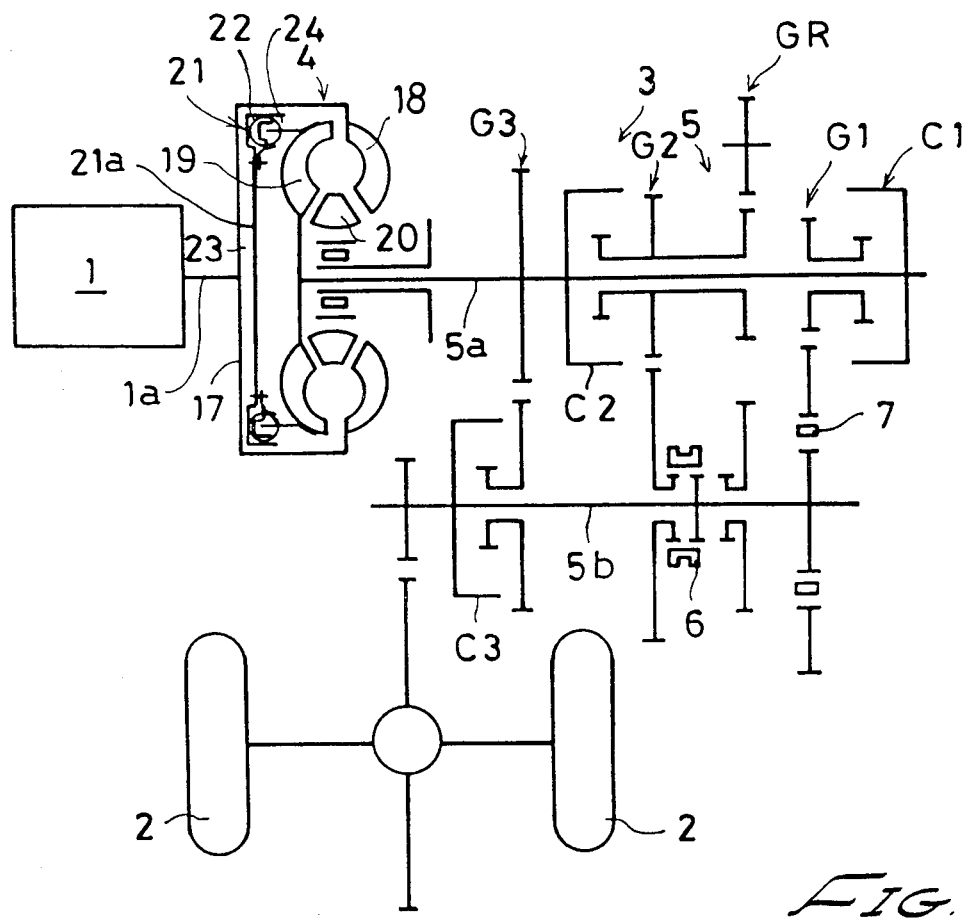
FIG. 1 is a diagram of the typical vehicular transmission arrangement in which the present invention is applicable.

In FIG. 1, reference numeral 1 indicates an engine, and numeral 2 indicates drive wheels of a vehicle. Indicated at numeral 3 is a vehicular transmission for coupling the engine 1 and the drive wheels 2. This transmission 3 is constructed of a fluid torque converter 4 and an auxiliary transmission 5 for performing speed changes of three forward speeds and one reverse.

The auxiliary transmission 5 is provided with 1st to 3rd speed forward gear trains G1 to G3 and a reverse gear train GR between a driving shaft 5a leading to the fluid torque converter 4 and a driven shaft 5b leading to the drive wheels 2. To the forward gear trains G1, G2 and G3, respectively, there are attached hydraulic clutches C1, C2 and C3 so that the gear trains G1, G2 and G3 may be selectively established by applying the hydraulic clutches C1, C2 and C3, respectively. On the other hand, the reverse gear train GR shares the 2nd speed hydraulic clutch C2 with the 2nd speed gear train G2 so that it is established by the rightward or reverse switching operation of a selector gear 6 for selecting one of the two gear trains G2 and GR. Indicated at reference numeral 7 is a one-way clutch which is disposed in the 1st speed gear train G1 and which is made operative to allow over rotations of the output shaft 5b.

Figure 2:
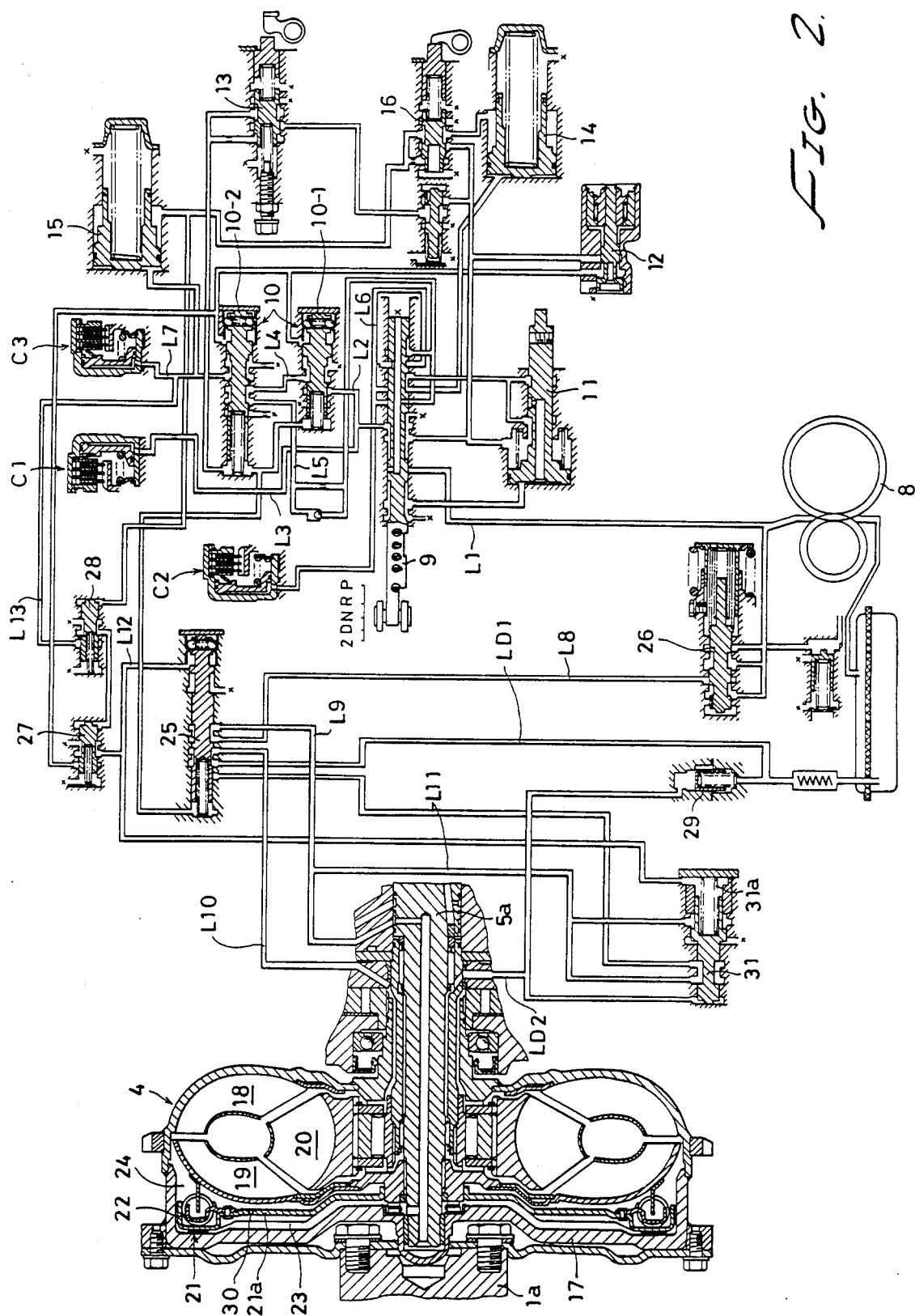
FIG. 2 is a hydraulic circuit diagram of one embodiment of the vehicular transmission and control device of this invention.

The aforementioned respective hydraulic clutches C1, C2 and C3 have their oil supplies and drains controlled by a hydraulic circuit shown in FIG. 2, for example. More specifically, this hydraulic circuit is equipped with: an oil pressure source 8; a manual valve 9 which can be switched among five positions, i.e., a parking range "P", a reverse range "R", a neutral range "N", a drive range "D" and a 2nd-speed holding range "2"; a shift valve 10 adapted to be switched in accordance with the vehicular speed and the throttle opening of the engine; and a forward-reverse switching servo-valve 11 for coupling the afore-mentioned selector gear 6. In the "D" range position of the manual valve 9, a first oil line L1 for oil supply leading from the oil pressure source 8 is connected to a second oil line L2 leading to the shift valve 10 so that the oil is supplied to the 1st speed hydraulic clutch C1 via a 3rd oil line L3 branched from said second oil line L2 and to the respective 2nd and 3rd speed hydraulic clutches C2 and C3 via the shift valve 10. Here, this shift valve 10 is composed of an upstream side 1st-speed/2nd speed shift first valve 10-1 and a downstream side 2nd speed/3rd speed shift second valve 10-2 which are connected with each other via an intermediate fourth oil line L4. Each of the valves 10-1 and 10-2 has its one end, i.e., its righthand end supplied with such a governor pressure from a governor valve 12 as accords to the vehicular speed and its lefthand end supplied with such a throttle pressure from a first throttle valve 13 as accords to the throttle opening of the engine. As the vehicular speed increases, the first valve 10-1 first moves from the righthand 1st speed position to the lefthand 2nd speed position so that the second oil line L2 is connected via the fourth oil line L4 with a fifth oil line L5 at the exit side of the second valve 10-2 thereby to supply the oil pressure to the 2nd speed hydraulic clutch C2 by way of a sixth oil line L6 which is connected with said fifth oil line L5 in the "D" range position of the manual valve 9. As the vehicular speed further increases, the second shift valve 10-2 moves from the righthand 2nd speed position to the lefthand 3rd speed position so that the fourth oil line L4 has its connection switched from the fifth oil line L5 to a seventh oil line L7 leading to the 3rd speed hydraulic clutch C3 thereby to supply the oil pressure to the 3rd speed hydraulic clutch C3. Indicated at reference numerals 14 and 15 in the drawings are accumulators for damping the pressures of the 2nd and 3rd speed hydraulic clutches C2 and C3, respectively. The back pressures of those accumulators 14 and 15 are regulated by a second throttle valve 16 in accordance with the throttle opening of the engine.

The aforementioned fluid torque converter 4 is equipped, in an internal space which is defined by a one-side input case 17 connected to the crankshaft 1a of the engine 1 and by an other-side pump 18 connected to the input case 17, with both a turbine 19 connected to the drive shaft 5a of the auxiliary transmission 5 and a stator interposed between the pump 18 and the turbine 19. The fluid torque converter 4 is further equipped with a hydraulically actuated clutch 21 for mechanically coupling the input side of said torque converter 4, i.e., the input case 17 and the ouput side of the same, i.e., the turbine 19. Thus, when said clutch 21 is released, there is afforded a fluid torque transmission by the circulation of the internal fluid among the aforementioned pump 18, turbine 19 and stator 20. When said clutch 21 is applied, on the other hand, a mechanical torque transmission is afforded therethrough.

The clutch 21 to be used may be of various types, e.g., of multi-disc type or one-way type. In the shown example, the clutch 21 is a single-disc friction clutch which has its clutch disc 21a made movable in the axial direction between the input case 17 and the turbine 19 and connected to the turbine 19 through a damper spring 22. The internal space of the fluid torque converter 4 is partitioned by said clutch disc 21a into a first oil chamber 23 on the side of the input case 17 and a second oil chamber 24 at the back side thereof. When the oil is supplied to the first oil chamber 23, said clutch disc 21a can be switched to a disconnected state in which it is disengaged from the input case 17. When the oil is discharged from the first oil chamber 23, on the other hand, the clutch disc 21a can be switched to a connected state in which it is brought by the internal pressure of said second oil chamber 24 into frictional engagement with said input case 17 by the engaging force corresponding to the pressure difference from the internal pressure in the first oil chamber 23. The oil supply and drain of said first oil chamber 23 are switched by a clutch control valve 25 which responds to the vehicular speed.

This clutch control valve 25 can be switched between a righthand side clutch released position (i.e., the shown position), in which an eighth oil line L8 for introducing the pressure oil from the oil pressure source through a regulator valve 26 is connected with a ninth oil line L9 leading to the first oil chamber 23 thereby to supply the oil to the first oil chamber 23, and a lefthand side clutch applied position in which said eighth oil line L8 is connected with a tenth oil line L10 leading to the second oil chamber 24 thereby to supply the oil to said second oil chamber 24 and in which an eleventh oil line L11 branched from said ninth oil line L9 is connected with a first drain line LD1 thereby to drain the oil from said first oil chamber 23. By the governor pressure coming from the aforementioned governor valve 12 and according to the vehicular speed, said control valve 25 is forced to the clutch applied position to connect the clutch 21 for a vehicular speed exceeding a predetermined value.

In the clutch released position, the second oil chamber 24 is supplied with the oil through the first oil chamber 23 to effect the fluid torque transmission by the fluid circulation among the aforementioned pump 18, turbine 19 and stator 20 which are arranged in the second oil chamber 24.

In the shown embodiment, moreover, the throttle pressure from the first throttle valve 13 is applied to said control valve 25 against the governor pressure so that the switch to the clutch applied position may be effected at a high speed in accordance with the increase in the throttle opening of the engine. In a twelfth oil line L12 for guiding the governor pressure into said control valve 25, still moreover, there is disposed a first shut-off valve 27 which is adapted to be opened by the oil pressure coming from the 3rd speed hydraulic clutch C3 through a thirteenth oil line L13, so that the governor pressure may be applied to said control valve 25 to apply the clutch 21 only when the 3rd speed gear train G3 is established. At the same time, there is disposed in said thirteenth oil line L13 a second shut-off valve 28 which is adapted to be closed by the throttle pressure from the second throttle valve 16 when the throttle opening of the engine is smaller than a predetermined value, so that the clutch 21 is not applied during deceleration.

Indicated at reference numeral 29 appearing in the drawings is a check valve which is disposed in a second drain line LD2 leading to the second oil chamber 24 for setting the internal pressure of said second oil chamber 24.

The construction thus far described is not especially different from the Assignee's prior patent applications identified above. According to the present invention, however, communication is provided between the aforementioned first and second oil chambers 23 and 24 through an orifice 30, e.g., a small hole formed in the clutch plate 21a so that the oil is supplied upon application of the clutch 21 from said second oil chamber 24 through said orifice 30 and said first oil chamber 23 to the eleventh oil line L11 leading thereto for drainage. In this eleventh oil line L11, there is disposed a regulator valve 31 which is adapted to respond to the external signal. At the same time, the internal pressures of the respective oil chambers 23 and 24 are exerted in opposite directions upon said regulator valve 31.

More specifically, the regulator valve 31 is supplied, in opposite directions, at its open side with both the governor pressure according to the vehicular speed as the external signal and the internal pressure of said first oil chamber 23 upstream of the eleventh oil line L11 and at its closed side with the internal pressure of said second oil chamber 24 upstream of the second drain line LD2. Thus: if the pressure receiving areas of the respective internal pressures are equal to each other and are designated as A; if the internal pressure of the first oil chamber 23 is designated as $P_1$; if the internal pressure of the second oil chamber 24 is designated as $P_2$; if the governor pressure is designated as $P_G$; if the pressure receiving area of the governor is designated as B; and if the set load to the open side by the spring 31a of said regulator valve 31 is designated as $F_S$, the relationship among the forces acting upon the regulator valve 31 is expressed by the following Equation:

$$P_2A = P_1A + P_GB + F_S \tag{1}$$

As a result, the following Equation holds:

$$P_2 - P_1 = \frac{B}{A} P_G + \frac{F_S}{A}. \tag{2}$$

Figure 3:
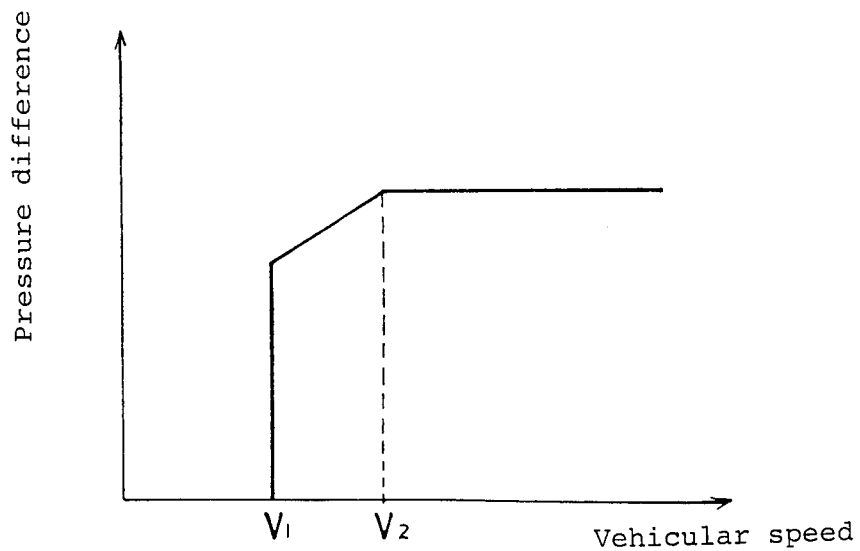
FIG. 3 is a graph illustrating the operating characteristics of the device of this invention upon the occurrence of changes in the pressure difference between the first and second oil chambers of the system of this invention.

The difference between the internal pressure of the second oil chamber 24 and the internal pressure of the first oil chamber 23 varies in proportion to the vehicular speed, as shown in FIG. 3, at a vehicular speed exceeding a predetermined value $V_1$, at which the clutch control valve 25 is switched to the clutch applied position. However, when the vehicular speed takes a high speed exceeding $V_2$, said regulator valve 31 is fully opened so that the pressure difference is subsequently held to a predetermined value equal to the internal pressure of said second oil chamber 24 and determined by the aforementioned check valve 29. In the high-speed range exceeding the value $V_2$, at which the engine torque fluctuates very little, the clutch 21 comes into its directly connected state. When the vehicular speed drops, on the other hand, the engaging force is weakened as a result of the drop of the pressure difference so that the clutch 21 can be switched to a slipping state in which slippage is allowed between its input and output sides.

The operation of the whole construction as it relates to vehicle operation will be described in the following. If the vehicular speed takes a high value exceeding $V_2$ during the cruising operation by the 3rd speed gear train G3, the clutch 21 is operated in its directly connected state, as has been described in the above, to ensure the efficient torque transmission by which the slippage between the input and output sides is prevented. When the vehicular speed becomes lower than the value $V_2$, on the other hand, the clutch 21 is brought into its slipping state by the drop of the pressure difference between the internal pressures of the second and first oil chambers 24 and 23. This effectively functions to absorb those torque fluctuations of the engine, which are liable to take place within a low vehicular speed range.

In this case, even if the viscosity of the oil flowing through the eleventh oil line L11 and the second drain line LD2 is changed by the change in the oil temperature so that a difference is caused between the oil pressure input to the regulator valve 31 and the actual internal pressures of the respective oil chambers 23 and 24, said regulator valve 31 is constructed to respond to the pressure difference therebetween so that their differences can be offset to control the engaging force of the clutch more accurately in accordance with the vehicular speed than the previous proposal by which only the internal pressure of the second oil chamber 24 is controlled.

Figure 4:
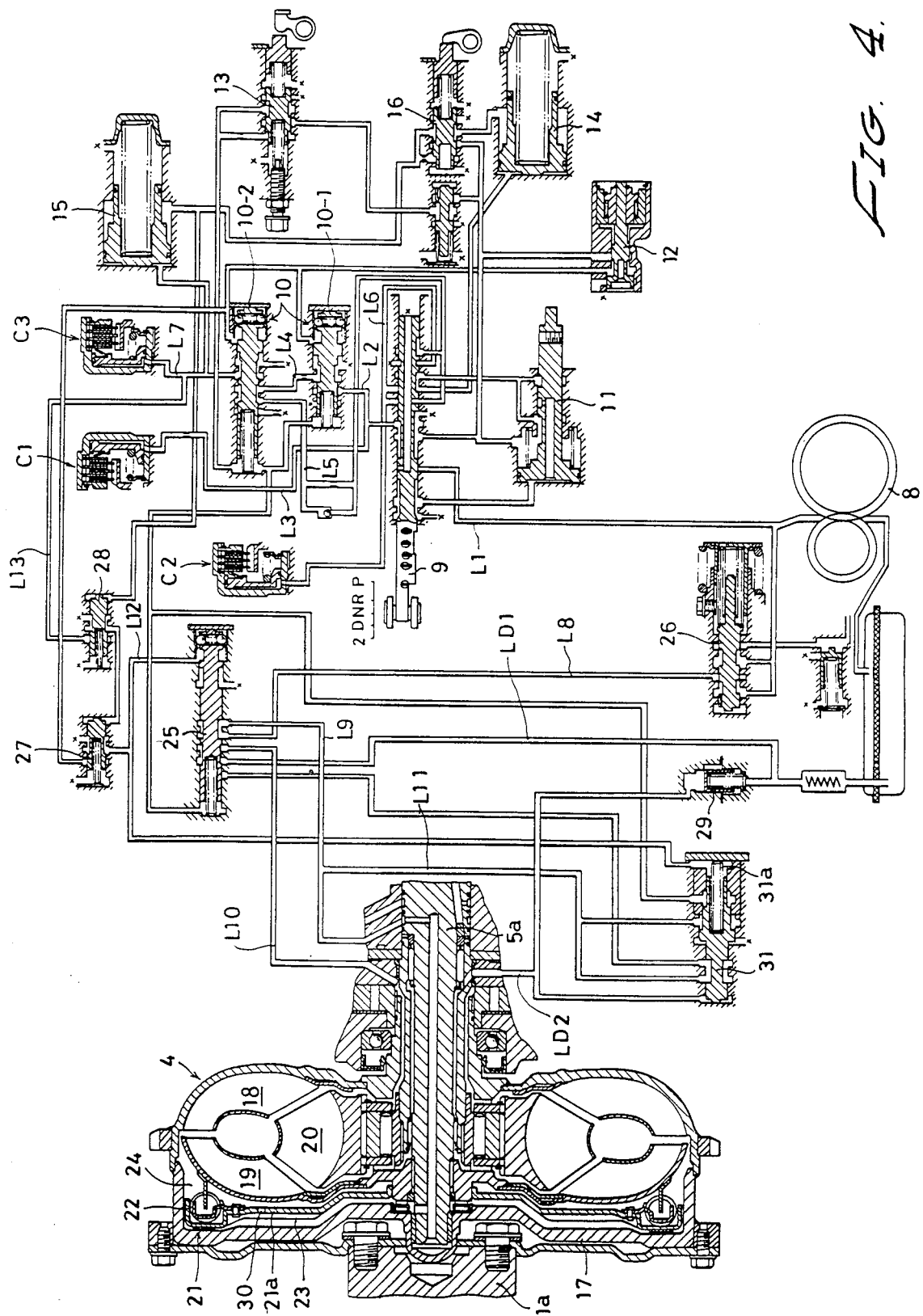
FIG. 4 is a hydraulic circuit diagram similar to FIG. 2 showing a second embodiment of this invention.

The description thus far made has been directed to the embodiment in which the governor pressure according to the vehicular speed is used as the external signal. However, the present invention should not be limited to that embodiment but can be modified, as shown in FIG. 4, such that the throttle pressure from the first throttle valve 13 is inputted as the external signal in addition to the governor pressure so that the engaging force of the clutch 21 may be increased or decreased in accordance with both the vehicular speed and the throttle opening, of the engine.

According to the present invention, there is disposed in the drain line leading to the first oil chamber the regulator valve which responds to the external signal so that the flow of the oil to be introduced during the application of the clutch from the second oil chamber through the orifice and the first oil chamber into said drain line may be controlled by said regulator valve. At the same time, the internal pressures of the respective oil chambers are applied in the opposite directions to said regulator valve. The pressure difference between the internal pressure of the second oil chamber and the internal pressure of the first oil chamber is detected by said regulator valve so that said pressure difference is accurately controlled to the predetermined value according to the external signal irrespective of the change in the oil temperature, whereby the engaging force of the clutch can be accurately controlled. Another beneficial effect is that the clutch operation control system of the present invention has its construction simplified and can be produced at a low cost.

While the present invention has been described in connection with two specific embodiments it is to be understood that our invention is not limited to these two embodiments but is of the full scope of the appended claims.

What is claimed:

1. In a clutch operation control system for a fluid torque converter in which a clutch is used to mechanically couple the input and output sides of the torque converter and the clutch is operated by hydraulic pressure applied to first and second oil chambers formed on one and the other sides of a clutch plate in which said hydraulic pressure is varied in response to an external signal, the improvement comprising, means for regulating the pressures in said first and second oil chambers including control means responsive in opposite directions to the actual internal pressures in said first and second oil chambers for controlling the difference in said pressures.

2. The clutch operation control system of claim 1 wherein said regulating means is responsive to an external signal for controlling said pressure difference between the first and second oil chambers to a predetermined level corresponding to said external signal.

3. The clutch operation control system of claim 2 for use in a vehicle transmission wherein said external signal corresponds to the vehicle speed to increase the pressure difference in response to increased speed.

4. The clutch operation control system of claim 3 wherein a second external signal corresponds to the throttle opening of the vehicle and tends to increase the pressure difference in response to increased throttle opening.

5. In a fluid torque converter of the type, in which there is provided a clutch for mechanically coupling the input and output sides of said torque converter, in which said clutch is constructed as a hydraulically actuated type adapted to be actuated by an application force according to the difference between the internal pressures of first and second oil chambers disposed at one and the other sides of a clutch plate thereof, and in which said pressure difference is increased or decreased in response to an external signal, a clutch operation control system comprising, an orifice providing communication between said two oil chambers, a regulator valve, a drain oil line leading from said first oil chamber to said regulator valve, and said regulator valve being responsive to said external signal and exposed in opposite directions to the internal pressures of said two oil chambers so that said pressure difference may be controlled to a predetermined level according to said external signal.

6. The clutch operation control system of claim 5 for a vehicle wherein said external signal corresponds to the vehicle speed.

7. In a fluid torque converter clutch operation system, comprising, a clutch for mechanically coupling the input and output sides of said torque converter, said clutch having a clutch plate and being constructed as a hydraulically actuated type having first and second oil chambers disposed on opposite sides of said clutch plate to be actuated by an application force according to the difference between the internal pressures of said first and second oil chambers, means for providing an external signal and causing said pressure difference to be increased or decreased in response to said external signal, means providing communication between said two oil chambers, a regulating means, a drain oil line leading from said first oil chamber to said regulator means, and said regulating means being responsive to said external signal and being exposed in opposite directions to the internal pressures of said two oil chambers so that said pressure difference may be controlled to a predetermined level according to said external signal.

* * * * *